United States Patent [19]

Velez

[11] Patent Number: 5,372,205
[45] Date of Patent: Dec. 13, 1994

[54] FURROW COVERING HOE FOR ONE HANDED OPERATION

[76] Inventor: Thomas A. Velez, 4185 Ruth Rd., Arab, Ala. 35016

[21] Appl. No.: 150,593

[22] Filed: Nov. 10, 1993

[51] Int. Cl.⁵ .............................................. A01B 1/06
[52] U.S. Cl. ................................. 172/371; 172/381; 111/197
[58] Field of Search ............. 172/371, 377, 380, 381, 172/684.5, 799.5, 701, 445.1, 269, 276, 285, 142.5, 190, 197

[56] References Cited

U.S. PATENT DOCUMENTS

| | | | |
|---|---|---|---|
| 60,195 | 12/1866 | Kasson | 172/381 |
| 194,386 | 8/1877 | Thatcher . | |
| D. 213,060 | 12/1968 | Kutz | D8/10 |
| D. 241,410 | 9/1976 | Atkinson | D8/1 |
| D. 297,605 | 9/1988 | Weitekamp | D8/11 |
| 312,218 | 2/1885 | Perrine | 172/381 |
| 387,806 | 8/1888 | Parker | 172/381 |
| 492,364 | 2/1893 | Powers | 172/377 |
| 745,753 | 12/1903 | Adams | 30/171 |
| 956,896 | 5/1910 | Gross | 37/278 |
| 1,019,417 | 3/1912 | Bott et al. | 172/684.5 |
| 1,049,812 | 1/1913 | Darling | 37/278 |
| 1,112,016 | 9/1914 | MacLachlan | 37/142.5 |
| 1,114,442 | 10/1914 | Brodie | 37/269 |
| 1,184,622 | 5/1916 | Clarkson | 172/684.5 |
| 1,232,188 | 7/1917 | Bernard | 172/381 |
| 1,271,606 | 7/1918 | O'Loughlin | 30/172 |
| 1,312,852 | 8/1919 | Kjölstad | 37/142.5 |
| 1,331,382 | 2/1920 | Rolland | 37/269 |
| 1,373,799 | 4/1921 | Conley | 172/684.5 |
| 1,385,089 | 7/1921 | Miller | 172/381 |
| 1,397,784 | 11/1921 | Ropp | 172/684.5 |
| 1,402,975 | 1/1922 | Stout | 172/381 |
| 1,423,865 | 7/1922 | Miller | 172/381 |
| 1,633,318 | 6/1927 | Drish | 172/377 |
| 1,667,591 | 4/1928 | Eden | 294/54.5 |
| 1,879,909 | 9/1932 | Roberts | 172/381 |
| 2,347,963 | 5/1944 | O'Neill . | |
| 2,548,012 | 4/1951 | Frost | 97/66 |
| 2,710,465 | 6/1955 | Timerson | 172/371 |
| 2,770,829 | 11/1956 | Williams | 30/172 |
| 2,773,318 | 12/1956 | Hemsath et al. | 37/53 |
| 2,899,003 | 8/1959 | Micek | 172/371 |
| 3,713,497 | 1/1973 | Hawkins | 172/719 |
| 3,719,234 | 3/1973 | Neece | 172/135 |
| 3,800,883 | 4/1974 | Ronning | 172/371 |
| 3,915,240 | 10/1975 | Pitman | 172/371 |
| 3,923,103 | 12/1975 | Davis et al. | 172/201 |
| 4,094,543 | 6/1978 | Fratini | 294/54.5 |
| 4,319,644 | 3/1982 | Young | 172/375 |
| 4,359,104 | 11/1982 | Haapala | 172/372 |
| 4,539,765 | 9/1985 | Reece | 37/142.5 |
| 4,892,156 | 1/1990 | Willis | 172/381 |
| 4,934,464 | 6/1990 | Sheilds | 172/377 |
| 5,097,910 | 3/1992 | Traczek | 172/378 |

FOREIGN PATENT DOCUMENTS

| | | | |
|---|---|---|---|
| 23869 | 8/1883 | Germany | 172/371 |
| 3441009 | 7/1986 | Germany | 172/371 |

*Primary Examiner*—Randolph A. Reese
*Assistant Examiner*—Spencer Warnick

[57] ABSTRACT

A hand held garden implement (FIG. 1) for refilling a furrow, requiring only one hand for operation, and allowing the operator to stand and walk fully erect. A handle (11) is attached into a receptacle (12) on a cover plate (13) which is connected to an inclined and converging scraper (14) which is connected to a bottom plate (15). Dirt is lifted up and into the tool as well as being pushed by it. Dirt then traverses the scraper towards the centerline of the tool, and is deposited into the furrow. The bottom plate then smoothes out and levels the deposited dirt.

5 Claims, 3 Drawing Sheets

FURROW COVERING HOE FOR ONE HANDED OPERATION

BACKGROUND-FIELD OF THE INVENTION

This invention generally pertains to garden implements, and more specifically to hand held garden implements for refilling a furrow.

BACKGROUND-DISCUSSION OF PRIOR ART

Several hand held implements are known in prior art to be capable of refilling a furrow. Such implements include hoes, rakes, and other implements commonly used for this purpose. However, these tools are not specifically designed for this purpose. To refill furrows whose length commonly exceeds a hundred feet (such as for rows of corn seed), which is the object of this discussion, these methods are strenuous at best. They are also not very effective, in that they require much repetitious motion to refill and level a furrow. Such implements always require two hands for operation.

Prior art also shows several implements with specific design features to include refilling a furrow. Examples of hand held implements which are designed to refill furrows are: U.S. Pat. Nos.: 1,232,188 (Bernard-Jul. 3, 1917); 1,385,089 (Miller-Jul. 19, 1921); 1,423,865 (Miller-Jul. 25, 1922); 2,548,012 (Frost-Apr. 10, 1951); 4,319,644 (Young,-Mar. 16, 1982); and U.S. Pat. No. Des. 241,410 (Atkinson-Sep. 14, 1976).

All such hand held implements, require downward force on one end (ground working element end) of a long handle. Simultaneously, an upward force must be exerted on the other (unattached) end of the handle. This "force coupling" is necessary to preclude the ground working element from rising up onto the longitudinal ridges of dirt piled up on either side of the furrow. If the implement rose up above the dirt, it would not refill the furrow, and would not leave the ground leveled as is desired. However, excessive application of the force coupling causes the element to dig into the ground below the nominal level. This increases the work effort required, and leaves that area "gouged" below the nominal ground level. By the very definition of a "force couple", all such hand held implements shown in the prior art that are specifically designed to refill long furrows therefore require operation with two hands.

BACKGROUND-OBJECTS AND ADVANTAGES

Accordingly, several objects and advantages of my furrow covering hoe are:
a) To provide a manual means to refill a long furrow with less strenuous effort than previously known, by:
  1) Precluding the operator from having to repeatedly lift and reposition the tool, such as when using hoes or rakes or scrapers.
  2) Necessitating only one handed operation with my furrow covering hoe, vice two handed operation as with prior implements. This is because no force coupling is required to control depth, etc. for my furrow covering hoe. To reduce the depth of scraping and hence dirt accumulation, the operator merely raises up on the end of the handle slightly. To increase depth of scraping and hence dirt accumulation, the operator merely lowers the end of the handle slightly. This is because the inclined leading edge allows scraping of dirt up into the tool itself for retention for the purpose of increasing the effective weight of the tool. This assists in holding the tool down, i.e.: provides a downward force upon the ground working element. If at any time, the tool is pushed opposite the normal working direction, the tool automatically empties itself of the accumulated dirt and becomes "lighter" again for easier handling. The broad bottom plate resists digging or sinking into the ground and provides a broad lever arm for raising the cutting edge by merely raising the end of the handle. This capability also allows use of my furrow covering hoe by handicapped people who do not have full use of two arms and two hands.
  3) Allowing the operator of my furrow covering hoe to utilize a normal vertical standing position, thereby reducing back strain. Prior implements require the operator being bent over because of the necessity of using two hands. My furrow covering hoe therefore assists people susceptible to back strain (E.g.: some elderly, handicapped, or otherwise infirm) to again enjoy working in a garden.
  4) Allowing the operator of my furrow covering hoe to walk facing the direction of travel, dragging the tool behind (with one hand), in full operation. This reduces strain and dangers of tripping, etc,, which would be inherent in a tool requiring two handed operation. This is because using two hands to apply the force coupling would either require a posture of being bent over while walking, or walking backwards, while pulling the tool,
b) To provide a means to manually refill a long furrow faster than was previously known. Because of the factors listed above in a1-a4, my furrow covering hoe allows the refilling of the furrow at almost normal walking speed. Previous tools refilled such long furrows at a much slower speed.
c) To provide a safer means to manually refill a long furrow. Walking forward with my furrow covering hoe rather than moving backwards increases visibility of the hazards in one's path. Reduction in body strain associated with using my furrow covering hoe as compared to others, reduces the possibility of injuries to the body, especially to the back.
d) To provide a tool which is simple to use to achieve nearly perfect results. My furrow covering hoe has no moving or adjustable parts. By merely raising or lowering the end of the handle while pulling the tool (as explained in a2 above), the tool is positioned to both refill the furrow and perfectly level the dirt with the adjacent ground. This also allows instantaneous adjustment for varying soil conditions and moisture content, such as a puddle of water at a low spot in the land.
e) To provide a low cost, efficient method of refilling long furrows, under varying conditions. Tractors can efficiently do the job in ideal conditions, but many owners of small acreage plots do not have a tractor or suitable attachments to accomplish this job. However, my furrow covering hoe can refill a long furrow at a slow to nominal walking speed, which approximates the nominal tractor speed in a garden. My tool also allows rapid results in conditions where a tractor could not go because of obstacles, or because the moisture in the ground would cause more ruts in the ground than before the tractor drove through the area.

f) Further objects and advantages of my invention will become apparent from a consideration of the drawings and ensuing description.

Figure 1:
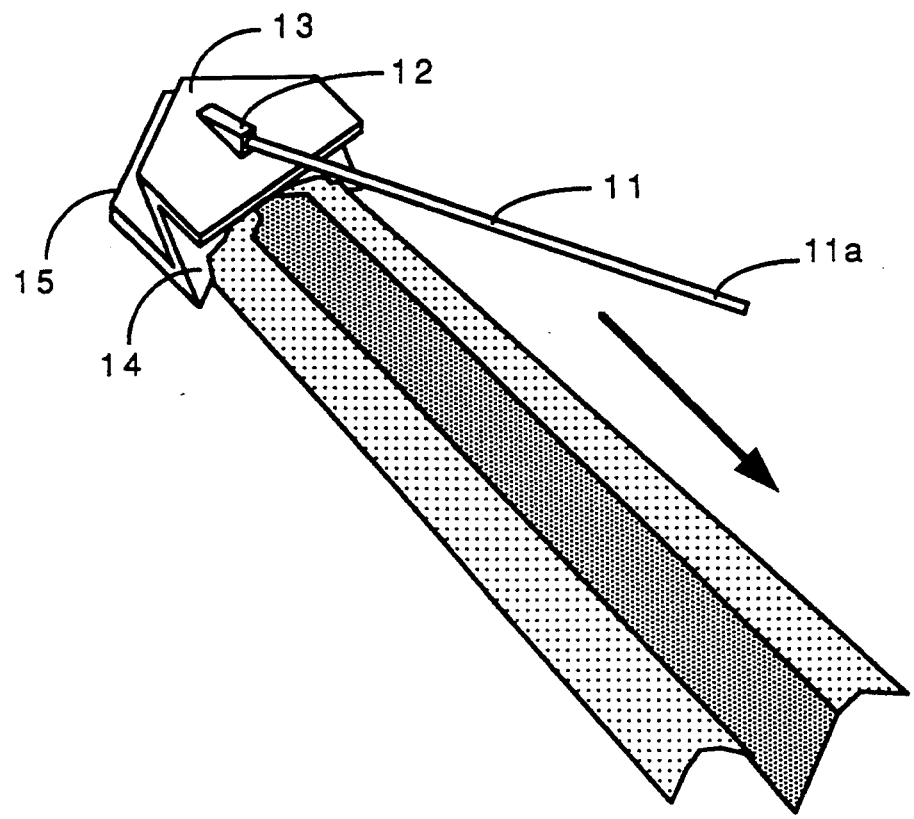
FIG 1 is a perspective view of the tool in normal preferred mode.

LIST OF REFERENCE NUMERALS 11 handle
11a pulled end of handle
12 receptacle
13 cover plate
14 scraper
14a leading edge working surface
14b scraper back surface
15 bottom plate
15a ski extensions

DESCRIPTION OF INVENTION

Figure 2:
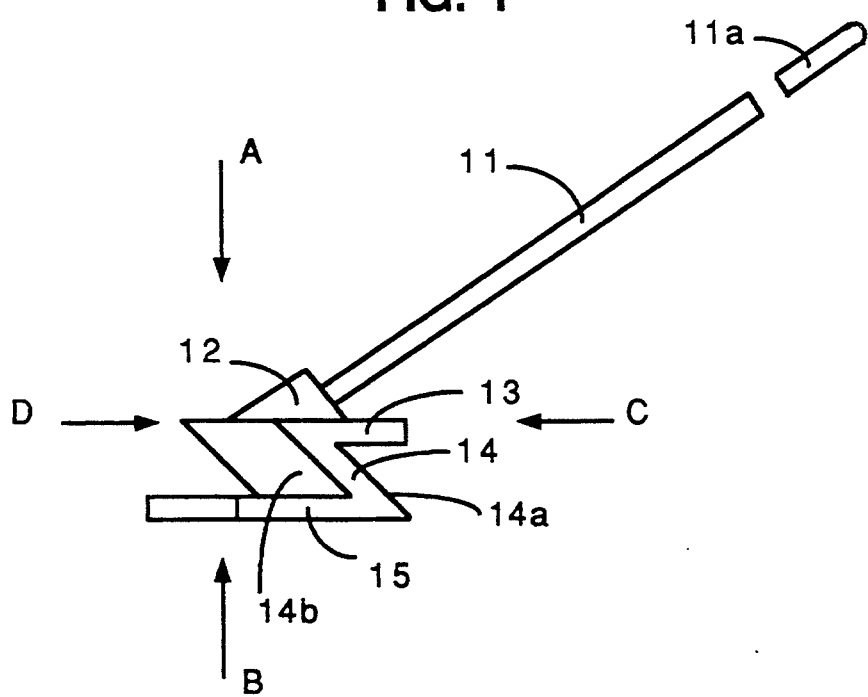
FIG. 2 is a side elevation view of the tool in the trench-covering position.
Figure 3:
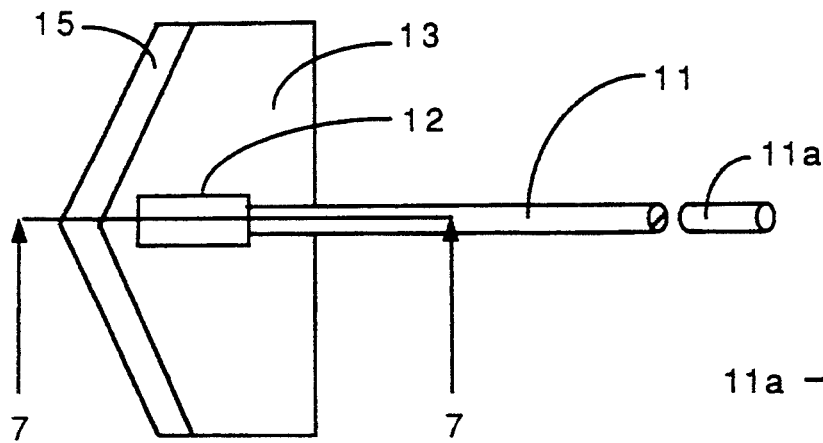
FIG. 3 is a plan view taken along the direction of "A" in FIG. 2.
Figure 5:
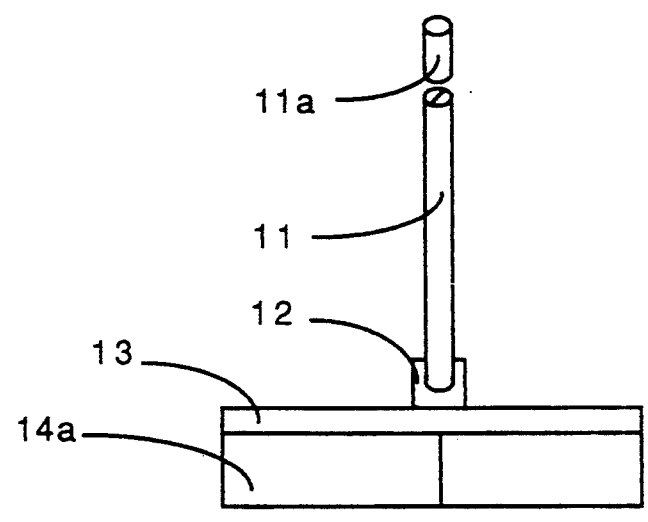
FIG. 5 is an elevation view taken aloha the direction of "C" in FIG. 2.

Referring to the drawings, wherein like reference numerals designate corresponding portions throughout the: several figures, the garden tool, as contemplated in the present invention, is generally shown in FIG. 2. This tool is comprised of a handle 11 which is used to pull and to generally align a ground working element (items 12 through 15). The pulled end of handle 11a is where one would normally grasp and pull the tool across the dirt. This pulled end of handle 11a may be straight, "D" shaped, "T" shaped, or be of another common shape to facilitate pulling by hand (or by a tractor). The handle for the manually operated implement would be about one and a half meters (4 to 5 feet) long and inclined (elevation angle) about 40 degrees above the horizontal plane (ground plane). The handle is inserted and attached (by any of various conventional means) into a receptacle 12. The receptacle is completely generic, and in its simplest form, may be merely a hole in a cover plate 13. This representative receptacle is integral (or attached) to the cover plate 13.

This cover plate holds an integral (or attached) scraper 14 which has a leading edge working surface 14a and a scraper back surface 14b. The leading edge working 14a surface (and indeed the entire tool) is symmetrical about a vertical plane aligned longitudinal which contains the handle and the centerline of the working element. This surface forms an angle to that plane of symmetry of about 60 degrees, thereby forming an obtuse angle with itself of about 120 degrees at the plane of symmetry. Additionally, this leading edge working surface is inclined approximately 30 to 60 degrees to the horizontal (ground) plane, with 45 degrees being currently preferred. The Figures show this leading edge working surface to be essentially flat surfaces joined and aligned as described above. However, this leading edge working surface may also be curved (instead of being comprised of flat surfaces) since this would not alter the function of the part at all. The scraper back surface may be parallel to the leading edge working surface or have another shape to enhance structural rigidity, ease of manufacture, or reduce costs, etc. since the shape of this scraper back surface serves no operable function in this invention.

To resist the leading edge digging into the ground, a bottom plate 15 is used. This plate is integral (or attached) to the leading edge working surface. The broad surface of the bottom plate also serves as an effective fulcrum on the soft dirt to allow the manual raising of the handle at 11a to lift the leading edge working surface higher with respect to the ground.

To reduce wear on the scraper, a removable or replaceable cutting edge can be made to cover the adjoining edge of the leading edge working surface with the bottom plate.

The construction of the tool is currently envisioned to be as follows. The handle would be made of wood or another form of commonly used materials for such handles (E.g.: fiberglass, composites, plastic, or metal). The ground working element (items 12-15) is currently envisioned to be one integral piece part, made of a conventional plastic, composite, or metal type material. Alternatively, the ground working element may be composed of the individual piece parts rigidly attached to each other by any common means of attachment (E.g.: bolts/nuts, welding, glue, etc.).

Figure 8:
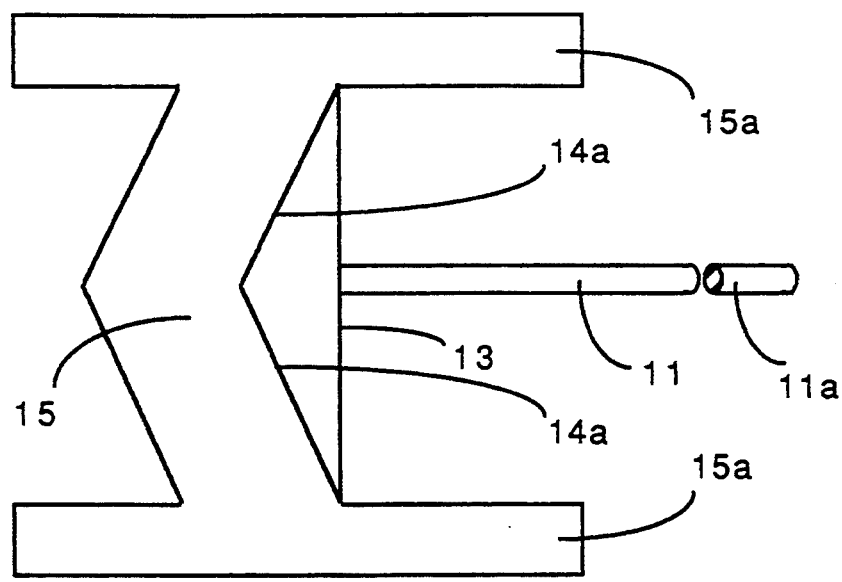
FIG. 8 is a plan view taken along the direction of "B" in FIG. 2 for a modification of the tool suitable for towing by tractor.
Figure 9:
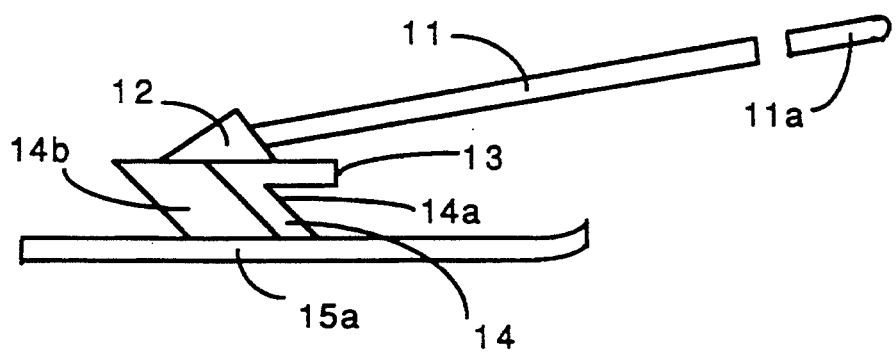
FIG. 9 is a side elevation view of the device of FIG. 8.

To facilitate this tool being towed by a typical garden tractor, only 3 modifications (FIG. 8, and FIG. 9) are required. First, as expected, pulled end of the handle 11a (now functioning as a tow bar) would need to contain a suitable conventional mechanism (not shown) for attachment to a tractor. Second, receptacle 12 would need to allow for changes in elevation of the handle, since it is desired that the ground working element (items 12-15) maintain a level relationship with the ground while being towed. Such a handle attachment scheme could be via a single horizontal attachment pin passing transversely through the handle (or tow bar), thereby allowing its elevation angle to vary while in use. Third, bottom plate 15 would be extended to form a pair of ski extensions 15a (runners with turned up leading surfaces) integral (or attached) at or near the outboard edges of the tool. These are of necessity constructed with a spacing wider than the expected dirt piles alongside of the furrow.

OPERATION OF INVENTION

FIG. 1 shows the normal use of my furrow covering hoe to cover a furrow. FIG. 2 clearly illustrates the relative positions of the components described below. To use the implement, the tool is positioned with bottom plate 15 flat on the ground, beyond the beginning of the furrow and its associated two longitudinal dirt piles (FIG. 1). The ground working element (items 12-15) must be wider than the furrow and these dirt piles. Handle 11 is rigidly attached to the ground working element via receptacle 12. While standing fully erect, the operator grasps the handle at position 11a with one hand, and pulls and walks in the direction shown, dragging the tool behind, occasionally glancing back to keep the ground working element directly centered above the furrow and to monitor its digging depth. Bottom plate 15 keeps the implement from sinking into the soft dirt. The bottom plate also provides a broad area over the soft dirt to provide a fulcrum upon which to raise the leading edge working surface of the scraper when the handle is manually raised at 11a. When the handle is manually lowered at 11a, she leading edge working surface is lowered into the dirt deeper. Thus, depth control is effected by raising or lowering the height of the handle at 11a, because the leading edge working surface is between 11a and the broad surfaced bottom plate, which is functioning as the fulcrum.

As my furrow covering hoe travels along the furrow, the dirt piles are gathered by leading edge working surface 14a. Two principal actions occur with this dirt. First, some dirt is lifted up onto the leading edge working surface and moves aft, into the tool itself. This function increases the weight of the ground working element, assisting in holding it down on the level ground, thus resisting any tendency to rise up onto the dirt piles. This function is accomplished because the leading edge working surface is inclined to the ground (approximately 45 degrees ) as shown. This orientation with the ground causes the tendency for the tool to dig into the ground. In all other known tools specifically designed to manually refill a long furrow, the scraping edge is perpendicular to the ground, or inclined opposite the direction shown in my invention. All these other known tools therefore would have a tendency for the scraper to rise up onto the dirt piles, unless another means of holding the scraper down is implemented, E.g.: manual force(s). Instead of flat surfaces for the leading edge working surfaces, curved surfaces (E.g. concave, convex, or twisting/varying inclination) could also be used since they would perform the same function of lifting up dirt, and forcing it to be ingested into the tool.

Figure 4:
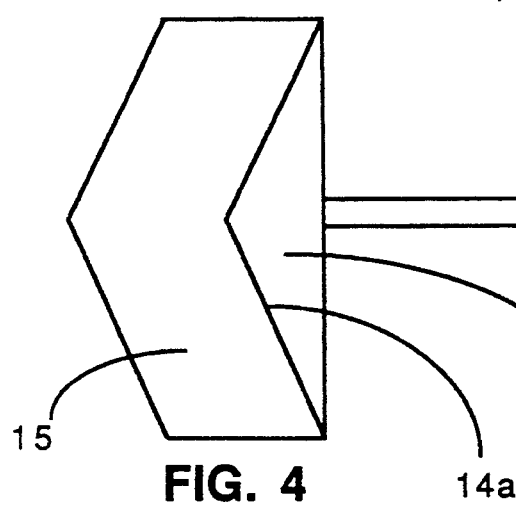
FIG. 4 is a plan view taken along the direction of "B" in FIG. 2.
Figure 6:
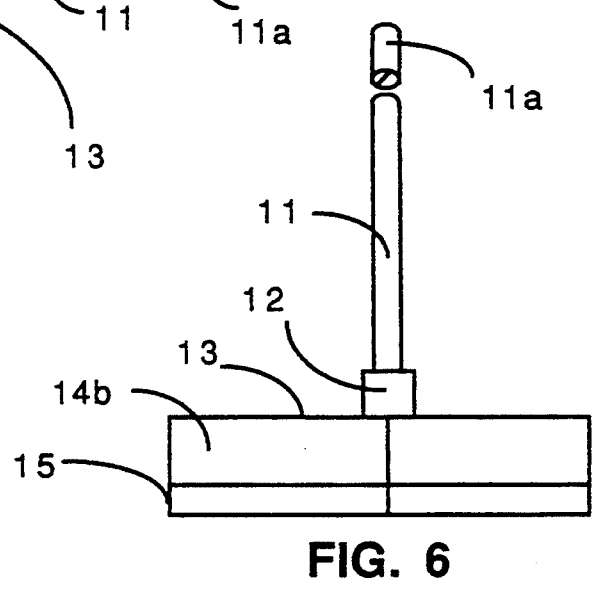
FIG. 6 is an elevation view taken along the direction of "D" in FIG. 2.
Figure 7:
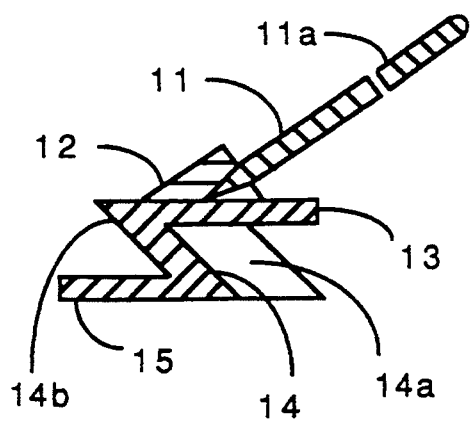
FIG. 7 is a section elevation view, taken along the direction of "7—7" in FIG. 3.

The second principal action occurring on the dirt is that dirt is forced to traverse a path parallel to leading edge working surface 14a, from an outboard (farthest from centerline, i.e.: farthest from plane of symmetry) position towards the centerline of the tool, and hence into the furrow. This is accomplished by the "V" shape of the leading edge working surface, clearly shown in FIG. 4. Instead of this "V" shape, a concave surface might also be employed, although it is believed that this shape would be no better than the "V" shape.

The bottom edge (FIG. 2) of the entire leading edge working surface 14a is level, and this helps level the filled furrow with the adjacent ground. The broad area bottom plate 15 is also level and also assists in compacting and leveling the furrow. Scraper back surface 14b has no operational function, other than to assist in structural rigidity, and therefore is not shape dependent.

Cover plate 13 has three primary functions. First, it transfers forces and torque from receptacle 12 and handle 11. Second, the cover plate provides a rigid attachment for scraper 14. Thirdly, the cover plate prevents dirt from rising up and over leading edge working surface 14a, thereby retaining dirt in the tool itself.

My furrow covering hoe modified to allow functioning as a singular towed tractor implement (FIG. 8 & FIG. 9), operates as follows. Pulled end of handle 11a contains a conventional device (not shown) for attachment to a tractor (E.g.: one containing a vertical attachment pin). The handle now actually functions as a tow bar and is retained in receptacle 12. This receptacle now allows elevation changes (but not lateral alignment changes) in the handle/tow bar as the tractor and tool traverse unleveled ground. This additional degree of freedom of movement of the handle at its receptacle 12, dictates that bottom plate 15 have a larger surface area to maintain a level fore and aft relationship with the ground. Otherwise, pulling on receptacle 12 would cause the implement to tip over forward (into the direction being pulled), since receptacle 12 can no longer transfer an upward torque from handle 11 to cover plate 13 to resist this tip over tendency. One way of accomplishing this is to extend the bottom plate 15 into a pair of ski extensions 15a with curved up leading surfaces to resist digging into the dirt. To aid in continual alignment of the tool over the furrow, any of several common means to force the tool to remain centered over the furrow can be used, if desired. Such concepts include rollers, rigid members, or other "feelers" tracking inside the furrow which would be attached (even temporarily) to the forward end (tow bar end) of the ground working element of the tool.

CONCLUSION, RAMIFICATIONS, AND SCOPE OF INVENTION

Thus the reader can see from the foregoing discussion, that the operation of my furrow covering hoe invention is extremely simple, effective, and requires only one hand. Only one hand is needed to place and align the tool. Only one hand is necessary to continuously and simultaneously pull, steer, and control the depth of operation of the tool. Additionally, the operator my furrow covering hoe can walk fully upright and face into the direction of travel; rather than moving backwards and/or in a stooped position as required when operating previously known tools with two hands. This significantly increases the speed of manually refilling a furrow, reduces back fatigue, and allows one to refill much longer furrows than they would otherwise be capable of manually doing. This also increases visibility in the direction of travel to help expose unexpected hazards. This tool has the versatility to immediately adjust to varying conditions, and can even be modified for towing behind a tractor. This tool provides a highly reliable, simple, lightweight, low cost tool that can easily be used by persons of almost any age and even by many handicapped people.

While my above description contains many specificities, these should not be construed as limitations on the scope of the invention, but rather as an exemplification of the preferred embodiment thereof. Many other variations are possible.

For example, 1) use by large tractors in a multiple ground working element arrangement, such as by being attached to towed toolbars via a modified receptacle, 2) towed by self propelled trench digging machines, to go back after laying water pipe or telephone cables to refill the trench.

Additionally, many combination hand tools could be made incorporating the manual version of this tool. For example, 1) a planter's hoe (to make a furrow) mounted on the ground working element of my invention, 2) a snow plow having a blade for pushing the snow, mounted on the edge of the ground working element opposite the handle.

Additionally, the manual version of my invention can be used as is for other purposes. For example, 1) plowing snow off of sidewalks (by pushing the handle-opposite the normal direction of motion), and for pulling down snow piles (or dirt piles), 2) for moving and leveling materials, such as concrete (prior to hardening), gravel, sand, etc.

Accordingly, the scope of the invention should be determined not by the embodiment(s) illustrated, but by the appended claims and their legal equivalents.

What is claimed:

1. A furrow closing tool for closing a furrow as it is dragged along the top of the furrow comprising:
   a. an elongated handle;
   b. a structural cover means for connection to the handle and the top of a scraper for prohibiting the flow of moved material over the top of the scraper; said scraper converges to a centerline of the tool to move material towards the centerline and into a furrow; and
   c. a bottom plate connected to the bottom of the scraper to aid in control of the tool.

2. The hand held implement of claim 1 wherein said scraper has a leading edge working surface inclined to the horizontal plane, which slopes aft as it rises to join with said cover means to allow material to be held in the tool as it is dragged along the furrow.

3. The furrow closing tool of claim 1, wherein the elongated handle is suitable for use by an operator while standing and walking erectly, dragging the tool behind.

4. The furrow closing tool of claim 1, wherein the elongated handle is suitable for connection to a towing vehicle so that the tool is dragged behind the towing vehicle.

5. The furrow closing tool of claim 1, wherein the scraper is V-shaped.

* * * * *